US006141017A

United States Patent [19]

Cubillo et al.

[11] Patent Number: 6,141,017
[45] Date of Patent: Oct. 31, 2000

[54] METHOD AND APPARATUS FOR SCALING AN ARRAY OF DIGITAL DATA USING FRACTAL TRANSFORM

[75] Inventors: Antoine Echeyde Cubillo, Doraville, Ga.; Ning Lu, Mountain View, Calif.

[73] Assignee: Iterated Systems, Inc., Atlanta, Ga.

[21] Appl. No.: 09/012,831

[22] Filed: Jan. 23, 1998

[51] Int. Cl.$^7$ ....................................................... G06T 3/40
[52] U.S. Cl. ........................... 345/439; 345/473; 382/248
[58] Field of Search ..................................... 345/439, 473; 382/248

[56] References Cited

U.S. PATENT DOCUMENTS

| 5,657,082 | 8/1997 | Harada et al. | 348/262 |
| 5,867,603 | 2/1999 | Barnsley et al. | 382/249 |
| 5,892,847 | 4/1999 | Johnson | 382/232 |
| 5,924,053 | 7/1999 | Horowitz et al. | 702/90 |

FOREIGN PATENT DOCUMENTS 0 742 672  11/1996  European Pat. Off. .

OTHER PUBLICATIONS

Database WPI—Derwent Publications Ltd., London, GB; XP002101126.
Gharavi–Alkhansari M. et al: "Resolution enhancement of images using fractal coding".

Gotting D., et al.; "Fractal Image Encoding and Analysis" Trondheim, Norway.

Anonymous: "Method for Scaling Fractal for Display by Finding Upper Bound on Extent".

Anonymous: "Method for Finding Geometrically Similar Fractal Confined to Fixed Region".

*Primary Examiner*—Mark Zimmerman
*Assistant Examiner*—Lance W. Sealey
*Attorney, Agent, or Firm*—Morris, Manning & Martin, LLP

[57] ABSTRACT

A method and apparatus are described for providing a scaled expanded image array of an original image array representing a physical entity, such as an image or sequence of frames, by utilizing fractal transform methods. The method of the invention includes steps performed by a data processor. Fractal transform methods are used to select a best domain/range block correspondence in an original image array. The range block is larger than the domain block. A subset of the data values in the range block is selected. Finally, an area of the expanded image array is populated with the data values in the selected subset where the area corresponds to the domain block location in the original image array.

9 Claims, 16 Drawing Sheets

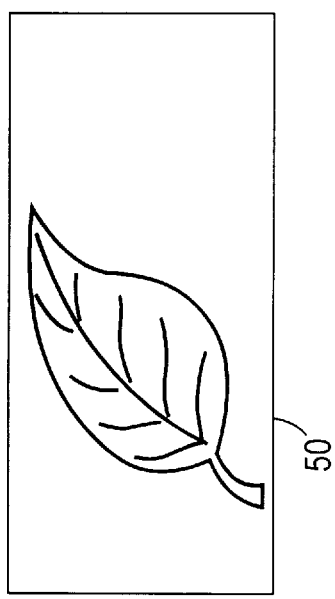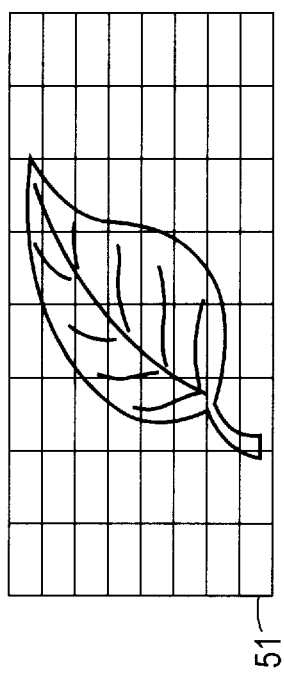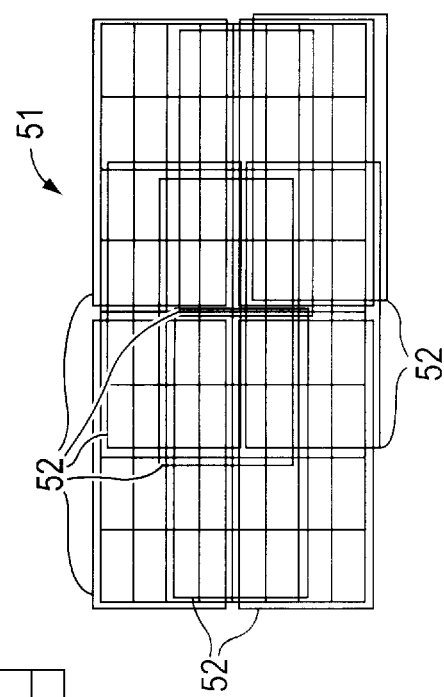

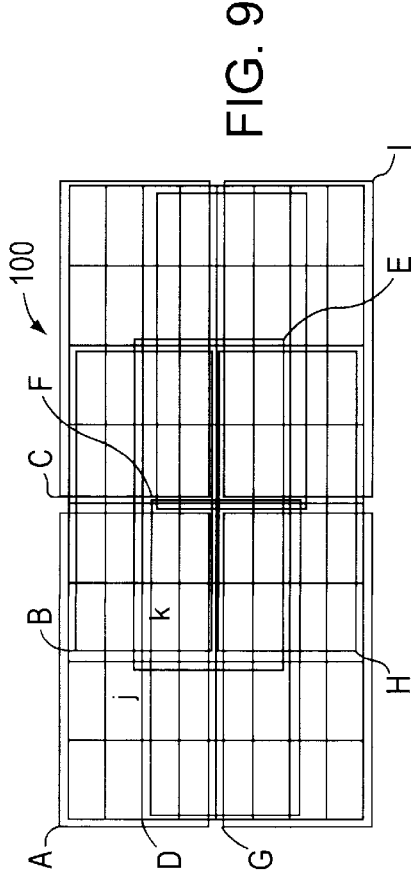

| 187 | 200 | 78 | 36 | 184 | 183 | 212 | 34 |
| 200 | 78 | 36 | 184 | 183 | 212 | 34 | 222 |
| 23 | 111 | 215 | 198 | 178 | 134 | 3 | 45 |
| 190 | 184 | 183 | 212 | 34 | 222 | 198 | 190 |
| 156 | 200 | 78 | 36 | 184 | 183 | 212 | 34 |
| 184 | 183 | 212 | 34 | 222 | 184 | 183 | 212 |
| 87 | 184 | 183 | 212 | 183 | 212 | 34 | 222 |
| 80 | 144 | 184 | 183 | 212 | 34 | 222 | 200 |

100

142

| 0.00 | 0.13 | 0.25 | 0.50 | 0.50 | 0.25 | 0.13 | 0.00 |
| 0.13 | 0.25 | 0.50 | 0.75 | 0.75 | 0.50 | 0.25 | 0.13 |
| 0.25 | 0.50 | 0.75 | 0.88 | 0.88 | 0.75 | 0.50 | 0.25 |
| 0.50 | 0.75 | 0.88 | 1.00 | 1.00 | 0.88 | 0.75 | 0.50 |
| 0.50 | 0.75 | 0.88 | 1.00 | 1.00 | 0.88 | 0.75 | 0.50 |
| 0.25 | 0.50 | 0.75 | 0.88 | 0.88 | 0.75 | 0.50 | 0.25 |
| 0.13 | 0.25 | 0.50 | 0.75 | 0.75 | 0.50 | 0.25 | 0.13 |
| 0.00 | 0.13 | 0.25 | 0.50 | 0.50 | 0.25 | 0.13 | 0.00 |

141

144

| 6 | 10 | 5 | 7 |
|---|----|---|---|
| 8 | 6  | 10| 4 |
| 2 | 8  | 4 | 8 |
| 5 | 4  | 7 | 3 |

| 6 | 8 | 10 | 7 | 5 | 6 | 7 | 6 |
|---|---|----|---|---|---|---|---|
| 7 | 7 | 8  | 7 | 7 | 6 | 6 | 5 |
| 8 | 7 | 6  | 8 | 10| 6 | 4 | 3 |
| 5 | 6 | 7  |   |   | 6 | 6 | 5 |
| 2 | 5 | 8  |   | 4 | 6 | 8 | 7 |
| 4 | 5 | 6  | 6 | 6 | 6 | 5 | 4 |
| 5 | 5 | 4  | 6 | 7 | 5 | 3 | 2 |
| 5 | 5 | 5  | 4 | 6 | 7 | 5 | 3 |

| 6 | 8 | 10 | 7 | 5 | 6 | 7 | 6 |
|---|---|----|---|---|---|---|---|
| 7 | 7 | 8  | 7 | 7 | 6 | 6 | 5 |
| 8 | 7 | 6  | 8 | 10| 6 | 4 | 3 |
| 5 | 6 | 7  | 7 | 7 | 6 | 6 | 5 |
| 2 | 5 | 8  | 6 | 4 | 6 | 8 | 7 |
| 4 | 5 | 6  | 6 | 6 | 6 | 5 | 4 |
| 5 | 5 | 4  | 6 | 7 | 5 | 3 | 2 |
| 5 | 5 | 5  | 4 | 6 | 7 | 5 | 3 |

METHOD AND APPARATUS FOR SCALING AN ARRAY OF DIGITAL DATA USING FRACTAL TRANSFORM

FIELD OF THE INVENTION

The present invention relates generally to enlarging two and three dimensional digital data arrays representing physical entities, and more particularly, to enlarging such arrays in a resolution independent manner.

BACKGROUND OF THE INVENTION

Digital imaging devices for capturing image data for display and other processing are well known. Such devices typically include a planar array of sensor elements that detect the intensity of light impinging upon the sensor element. The light intensity is converted to an electrical signal which may be digitized to generate a digital value corresponding to the intensity of light detected by the sensor element. These data values may then be filtered or subjected to other signal processing to reduce artifacts generated by the quantizing of the image data.

Frequently, image data captured by an image device is manipulated to "zoom" or expand the image. That is, the m×n sensor element image captured by the device is expanded to an i×j image, where i and j are greater than m and n respectively. To zoom an image, the data of an original image array may be moved to an expanded image array as each data value has a corresponding location in the expanded image array. However, there are also numerous array locations in the expanded image array which have no corresponding data value in the original image array. Interpolation methods have been developed to generate data values for each array location having no corresponding data value in the original image array. Typically, these interpolation methods use a mask or other weighting criteria to generate a data value from those data values neighboring the array location for which the data value is being generated. The weighting schemes are typically constructed so that those data values closer to the array location for which a data value is being generated contribute more than the more distant points. Additionally, directional vectors may be determined which indicate that the contribution of data from one area should be weighted more heavily than data from another area that is the same distance from the subject array location. However, if the expansion factor for the expanded image is significant, the quality of the image may be degraded or artifacts generated. Likewise, successive expansions of an image compound the degradation and artifact generation as subsequent zoom images contain proportionally less data values taken directly from the original image array.

What is needed is a method for accurately zooming an original image array to improve the image resolution of expanded images.

What is needed is a method for zooming an original image array after transmission of the original image array in a compressed form that is independent of the compression method used on the original image array.

SUMMARY OF THE INVENTION

In accordance with the purpose of the invention, there is provided a method for increasing the dimensions of an original image array representative of a physical entity partitioned into overlapping domain blocks, comprising steps performed by a data processor. These steps include using fractal transform methods to select a best domain/range block correspondence in an original image array where the range block is larger than the domain block. Next, a subset of data values in the range block is selected and an area of an expanded image array is populated with the data values in the selected subset. The area of the expanded image array corresponds to the domain block location in the original image array.

In another aspect of the invention, there is provided apparatus for increasing the dimensions of an original image array representative of a physical entity. The apparatus includes an input device for supplying the original image array and a memory for storing the original image array. Furthermore, a data processor is provided for partitioning the original image array into overlapping domain blocks and partitioning the original image array into range blocks, and for each domain block: (1) performing fractal transform methods to select a best domain/range block correspondence; (2) selecting a subset of data values in its corresponding range block, the selected subset being larger than said domain block; and (3) populating an area of an expanded image array with the data values in the selected subset where the area corresponds to the domain block location of the original image array. Finally, an output device including an expanded image array to receive data from the data processor is provided.

In yet another aspect of the invention, there is provided a method of producing an expanded image array larger than, proportional to, and visually similar to an original image array representative of a physical entity and performed by a data processor. The data processor receives a compressed data array including a compressed representation of the original image array and expansion data. The original image array is recovered from the compressed representation and expanded into an expanded image array using the expansion data.

The invention provides in another aspect a method for processing sets of codewords and motion vectors where each set of codewords and motion vectors represents a frame in a video stream, and each codeword represents one of a plurality of overlapping domain blocks covering an area of a frame. The method is comprised of steps performed in a data processor. A expanded version of the previous frame is provided in a feedback buffer. The data processor receives a compressed data array into a compressed buffer, recovers the frame at its original resolution, and writes the frame into an input buffer. Each motion vector is applied to the contents of the feedback buffer with the results written to an output buffer having the same dimensions as those of the feedback buffer. The input buffer is partitioned into overlapping domain blocks and partitioned into range blocks. Next, the data processor determines which codewords do not correspond on areas of the output buffer previously populated by the motion vectors, and decodes each non-conflicting codeword by selecting a subset of data values in the range block identified by the codeword and populating an area of the output buffer with the data values where the area of the output buffer corresponds to the domain block location of the codeword in the frame. Finally, the contents of the feedback buffer are replaced with the contents of the output buffer, and it is determined if another frame is to be decoded.

DETAILED DESCRIPTION OF THE DRAWINGS

FIG. 1 shows an object represented by an original image array, and the original image array partitioned into domain blocks.

FIG. 9 shows the original image array of FIG. 7 partitioned into nine overlapping domain blocks.

FIG. 10 is a domain block of the original image array of FIG. 7.

FIG. 11 shows the generation of a shrunken range block.

FIG. 12 shows generation of a portion of an expanded image array according to one aspect of the invention.

FIG. 13 shows an expanded image array.

FIG. 14 shows the generation of a portion of an expanded image array according to one aspect of the invention.

FIG. 15 shows an expanded image array.

FIG. 21 shows a 4×4 original image array.

FIG. 22 shows a partially populated expanded image array.

FIG. 23 shows a partially populated expanded image array.

DETAILED DESCRIPTION OF THE INVENTION

Figure 2:
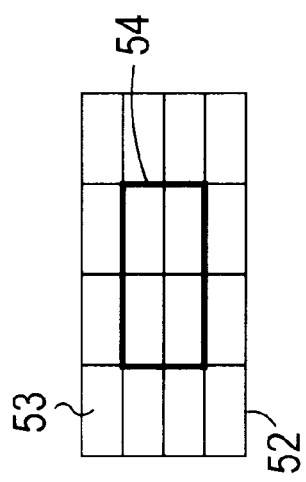
FIG. 2 is a domain block.

In the preferred embodiment, an original image 50 (FIG. 1a) is represented by original image array 51 of pixels (FIG. 1b) partitioned into rectangular domain blocks, severally indicated as 52 (FIG. 1c). Original image array 51 may represent an image, an image in a series of images, or any other type of physical entity, such as audio information, seismic data, etc. It is to be noted that unlike traditional domain block mappings, domain blocks 52 overlap. Accordingly, as shown in FIG. 2, each domain block 52 can be thought of as comprising two types of data, domain border data 53 and domain center data 54.

Figure 3:
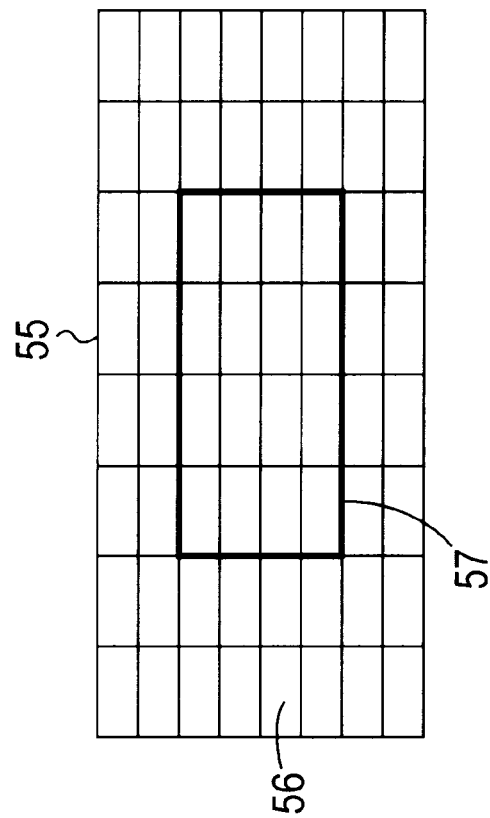
FIG. 3 is a range block.

Original image array 51 is also partitioned into subsets known as "range blocks". Adverting to FIG. 3, a single range block 55 is defined as including all of original image array 51, although it is more customary to partition an array into a plurality of range blocks. Similar to each domain block 52, range block 55 can be thought of as comprising two types of data, range border data 56 and range center data 57 (FIG. 3).

Local Zooming

Figure 4:
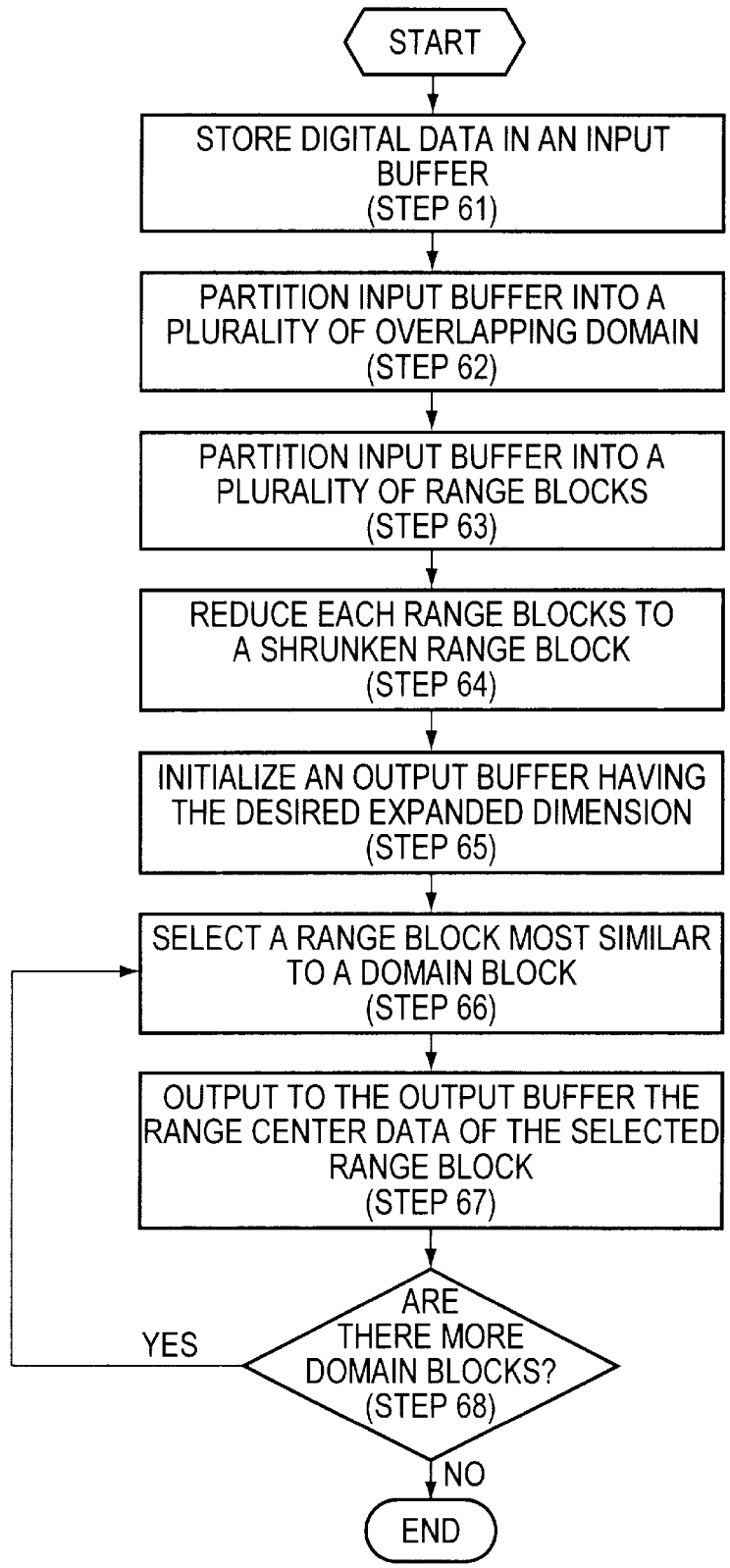
FIG. 4 is a logic flow diagram of a method for increasing the dimensions of an original image array representative of a physical entity.

The invention contemplates the expansion of any m×n original image array 51 by determining for each domain block of the array its most similar range block, taking a subset of data values of the range block and populating an area of an expanded image array of desired dimensions i×j where the area corresponds to the domain block location in the original image array. The specific steps to accomplish the expansion is best shown by reference to FIG. 4.

1. Storing digital data of a predetermined size as an original image array in the input buffer of a data processor (Step 61);
2. Generating a plurality of uniquely addressable overlapping domain blocks by dividing the original image array into a plurality of rectangular areas such that all the domain blocks taken together contain all the stored data (Step 62);
3. Generating a plurality of uniquely addressable range blocks comprising range center data and range border data (Step 63);
4. Reducing each range block to a shrunken range block having a one-to-one correspondence of pixel values with the domain blocks (Step 64);
5. Initializing an output buffer of a predetermined size larger than but proportional to that of the original image array (Step 65).
6. Selecting a range block and transformation (comprising a symmetry operator and pixel operator) for a domain block satisfying one of the following criteria:
   (a) the distance between the domain block and the transformed range block is the minimum possible over all range blocks and transformation, or
   (b) the distance between the domain block and the transformed range block falls below a given threshold, or
   (c) the range block satisfies a secondary criteria range block and the transformed range block falls below a given threshold (Step 66);
7. Outputting the range center data to the location of the output buffer proportionately corresponding to the location of the domain center data of the domain block in the original image array (Step 67);
8. Repeating Steps 66–67 for each domain block (Step 68), The output buffer at the conclusion of the process contains an expanded image array representing an image visually similar to the image of the original image array.

Figure 5:
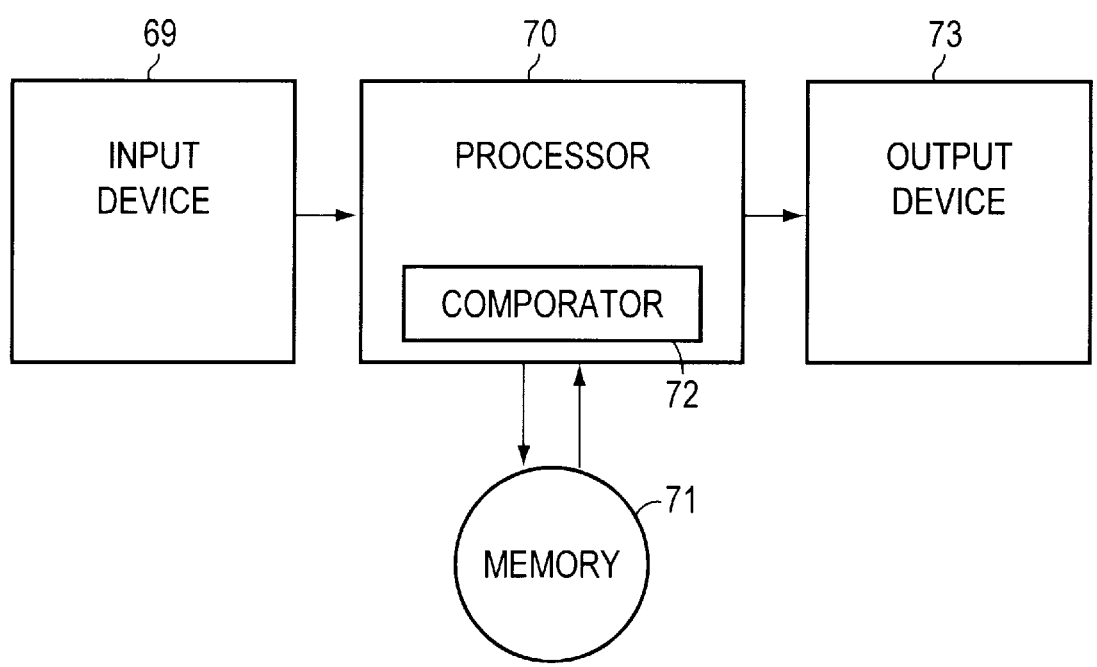
FIG. 5 is a block diagram of an apparatus which can execute the method of FIG. 4.

The method set forth above can be performed in the apparatus as shown in FIG. 5. An input device 69 supplies the digital data of an original image array to a processor 70. The input device 69 may, for example, be a document scanner or a computerized axle tomography (CAT) machine. Processor 70 stores the original image array into a memory 71 in the form of a data array of predetermined size. Alternatively, input device 69 could present the original image array to memory 71 that processor 70 then accesses. Processor 70 generates a set of uniquely addressable overlapping domain blocks from the stored original image array. Each domain block represents a different portion of the stored original image array, such that all domain blocks together contain all of the stored original image array. Processor 70 also creates, from the stored original image array, a set of uniquely addressable range blocks, each corresponding to one of a plurality of subsets of the stored original image array. Each of the subsets has a unique address represented by a block identifier. Processor 70 generates a shrunken version of each range block having a one-to-one correspondence between its pixel values and those of a domain block.

A comparator 72 coupled to processor 70 applies a transform, including pixel and symmetry operators, to a shrunken range block and compares the transformed range block to each domain block. This process is repeated until a most similar range block is identified for each domain block.

Next, for each domain block, comparator 72 outputs at least the transformed range center data of its corresponding range block to an output device 73. Output device 73 includes a buffer of a predetermined size greater than that of the original image array. The range center data is placed in the buffer of output device 73 at a location proportionally corresponding to the position of the domain center data of the domain block on the original image array. Alternatively, comparator 72 could output the transformed range center data to memory 71 that output device 73 accesses. Averaging of some pixel values may be necessary based on the overlap scheme used to generate the domain blocks.

In a preferred embodiment, processor 70, memory 71 and comparator 72 are implemented in a general purpose computer such as an Indigo 2 work station commercially available from Silicon Graphics, Inc. Alternatively, all or part of the apparatus of FIG. 5 can be implemented in custom hardware for high speed application.

Distant Zooming

The method of the present invention can expand a compressed data array including a compressed representation of an original image array and expansion data to produce a visually similar and rescaled representation of an original image array independent of the method used to compress the image. In the preferred implementation, the data processor has a compressed buffer for receiving the compressed data array, an input buffer having the dimensions of the original image array, and an output buffer having the desired expanded dimensions.

Figure 6:
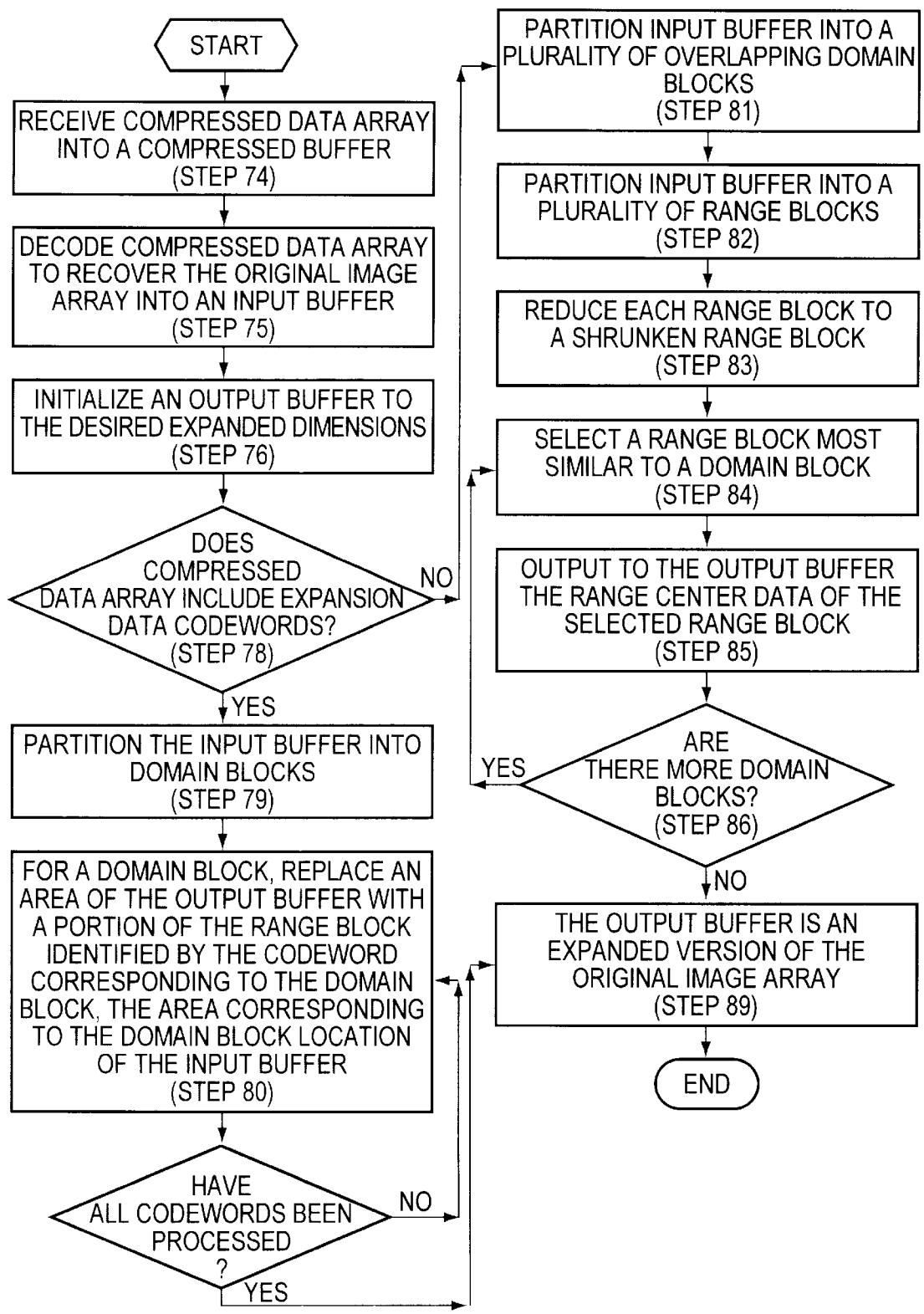
FIG. 6 is a logic flow diagram of a method for increasing the dimensions of an original image array representative of a physical entity at a distant location.

The decoding procedure is shown in FIG. 6. In a preferred form, the procedure consists of:

1. Receiving the compressed data array into a compressed buffer (Step 74);
2. Decoding the compressed data array to recover the original image array using a decoding method matching the compression method used to create the compressed data array, and populating the input buffer with the decoded original image array (Step 75);
3. Initializing an output buffer to the desired expanded dimensions (Step 76);
4. Determining if the compressed data array includes expansion data in the form of codewords where each codeword (1) defines a domain block covering a portion of the original image array, (2) identifies a range block, also covering a portion of the original image array, that is larger than the domain block, (3) includes a transform that can be applied to the identified range block to provide a transformed range block most similar to the domain block of the codeword;
5. If expansion data is present:
   (a) Partitioning the input buffer into domain blocks as defined by the codewords of the expansion data (Step 79),
   (b) For each domain block, replacing an area of the output buffer with a portion of the range block identified by the codeword corresponding to the domain block, the area corresponding to the domain block location in the input buffer (Step 80);
6. If no expansion data is present,
   (a) Partitioning the input buffer into a plurality of uniquely addressable overlapping domain blocks by dividing the original image array into a plurality of rectangular areas such that all the domain blocks taken together contain all the stored data (Step 81);
   (b) Partitioning the input buffer into a plurality of uniquely addressable range blocks comprising range center data and range border data (Step 82);
   (c) Reducing each range block to a shrunken range block having a one-to-one correspondence of pixel values with a domain block (Step 83);
   (d) Selecting a range block and transformation (comprising a symmetry operator and pixel operator) for a domain block satisfying one of the following criteria:
      (1) the distance between the domain block and the transformed range block is the minimum possible over all range blocks and transformations, or
      (2) the distance between the domain block and the transformed range block falls below a given threshold, or
      (3) the range block satisfies a secondary criteria range block and the transformed range block falls below a given threshold (Step 84);
   (e) Outputting the range center data to the location of the output buffer corresponding to the location of the domain center data of the domain block in the original image array (Step 85);
   (f) Repeating Steps 84–85 for each domain block (Step 86); and
7. The resulting output buffer is an expanded version of the original image array (Step 88).

Examples of fractal zooming of the present invention applied to an image represented by an 8×8 digital data array are now described.

EXAMPLE 1

Figures 7, 8:
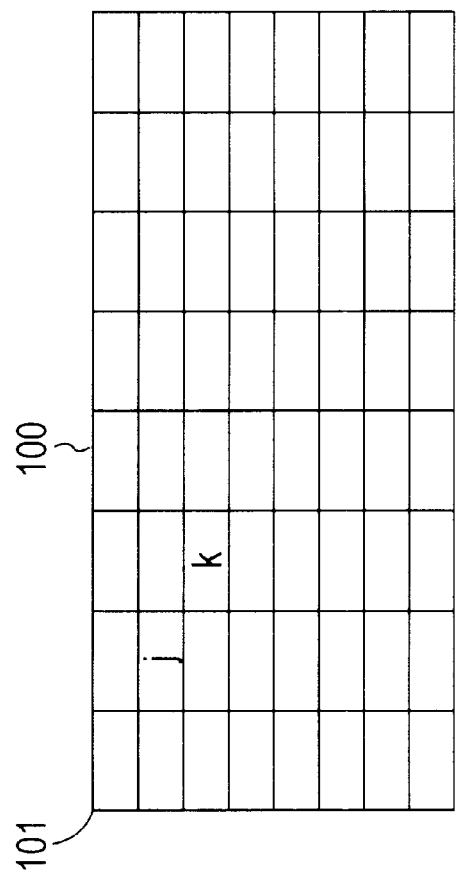
FIG. 7 is an original image array.
FIG. 8 is the original image array of FIG. 7 including values for each pixel.

FIG. 7 shows an 8×8 data array 100 representing an image. Each pixel of array 100 is assigned a unique address in the form $$X_{100_{(i,j)}}$$

for values of i and j from 0, ..., 7. For example, if the upper left corner 101 of array 100 is considered the origin (i.e., (0,0)), then the value of pixel j corresponds to the address $V_{100_{(1,1)}}$. FIG. 8 shows each pixel value for array 100. In this example, the pixel values represent brightness within the range 0 (black) to 255 (white). Accordingly, the brightness value of pixel j, $V_{100_{(1,1)}}$ is 78. The pixel values can be stored in an array of computer memory in any well known manner.

The invention contemplates forming an expanded image array by identifying for each domain box A–I a most similar range block, and placing into the expanded image array the range center data of the identified range block at the location proportionally corresponding to the location of the domain center data of the domain block.

As shown in FIG. 9, array 100 is partitioned into 9 overlapping domain blocks, referred to by reference characters A–I. Domain blocks A–I each define a subarea of array 100 and are generated by shifting a 4×4 template two pixels. For example, domain block A is defined by the 4×4 template. Shifting the 4×4 template 2 pixels laterally to the right defines domain block B. Shifting the 4×4 template 2 pixels laterally to the right again defines domain block C.

Shifting the 4×4 template back to domain block A and down 2 pixels defines domain block D and so on until all domain blocks A–I are defined. Turning to FIG. 10, domain block A is shown to comprise domain border data 102, and domain center data 103. The boundaries for domain border data and domain center data are identical for each domain block A–I.

It will be noticed that certain pixels fall within more than one domain. For instance, in FIG. 9, pixel j falls within domain block A. However, pixel k falls within domain blocks A, B, D and E. It will also be noticed that although the domain border data of domain blocks A–I may overlap other domain border or domain center data, the domain center data of domain blocks A–I do not overlap.

The invention contemplates determining for each domain block a range block that is most similar by using fractal transform methods well known in the art. In this simplified example, there is only one range block 104, namely, the entire array 100, comprising range border data 105 and range center data 106, seen best in FIG. 11. Thus, the range block address portion of each codeword in this example is the same.

A square can be rotated to 4 orientations or flipped and rotated into 4 other orientations Therefore, each domain block must be compared to up to 8 different orientations of range block 104. Different choices for the shape of the domain mask will yield a correspondingly, finite, table of symmetries readily obtained by methods well known in the art. In this example, the symmetry of each range block will be the same for simplicity.

There must be a one-to-one correspondence between the pixels of a domain block and a range block before a comparison can be conducted. This is accomplished as shown in FIG. 11 by producing a reduced or "shrunken" range block 107. The reduction is performed by any one of the methods well known in the art. Here, for example, range block 104 has twice the spatial dimensions of domain blocks A–I. Accordingly, we must obtain a single representative value for each 2×2 sub-block of range block 104, severally indicated at 108, to generate 4×4 shrunken range block 107. Shrunken range block 107 can then be manipulated to the 8 possible symmetries for comparison with each domain block A–I.

A pixel operator is applied to shrunken range block 107 and a domain block is compared to the eight possible orientations of the transformed shrunken range block 107. Given two candidate blocks, there are a variety of well-known distance functions which may be used to compare the blocks including $L^P$ Distance, $L\infty$ Distance and Weighted Distance. Thus, the orientation of range block 104 and pixel operator applied to range block 104 generating the transformed range block most similar to each domain block A–I is determined. The transform between a domain block and its corresponding range block is in the form $x \rightarrow \text{trunc}(px+q)$ where p and q are real numbers and the truncation operation consists of rounding the real number px+q 3to an integer lying in a range of pixel values. A detailed explanation of the process to determine a best domain/range block correspondence is presented in U.S. Pat. Nos. 5,065,447 and 5,347,600 to Barnsley and Sloan, hereby incorporated by reference.

Table 1 lists for each domain block the orientation of range block 104 and the transformation values (p and q) providing the best domain/range block correspondence.

TABLE 1

| DOMAIN BLOCK | REFLECTION | ROTATION (CLOCKWISE) | p | q |
|---|---|---|---|---|
| A | No | 0 | 7/8 | 13 |
| B | No | 0 | 7/8 | 22 |
| C | No | 0 | 7/8 | 10 |
| D | No | 0 | 7/8 | 18 |
| E | No | 0 | 7/8 | 25 |
| F | No | 0 | 7/8 | 19 |
| G | No | 0 | 7/8 | 14 |
| H | No | 0 | 7/8 | 67 |
| I | No | 0 | 7/8 | 69 |

A 16×16 expanded image array can be populated with data representing a proportionally enlarged and visually similar image to that of array 100 by placing for each domain block A–I the 4×4 range center data 106 of range block 104 manipulated and transformed as required by Table 1 into the expanded image array at the location proportionally corresponding to the location of the domain center data 103 of that domain block in array 100.

Figure 12:
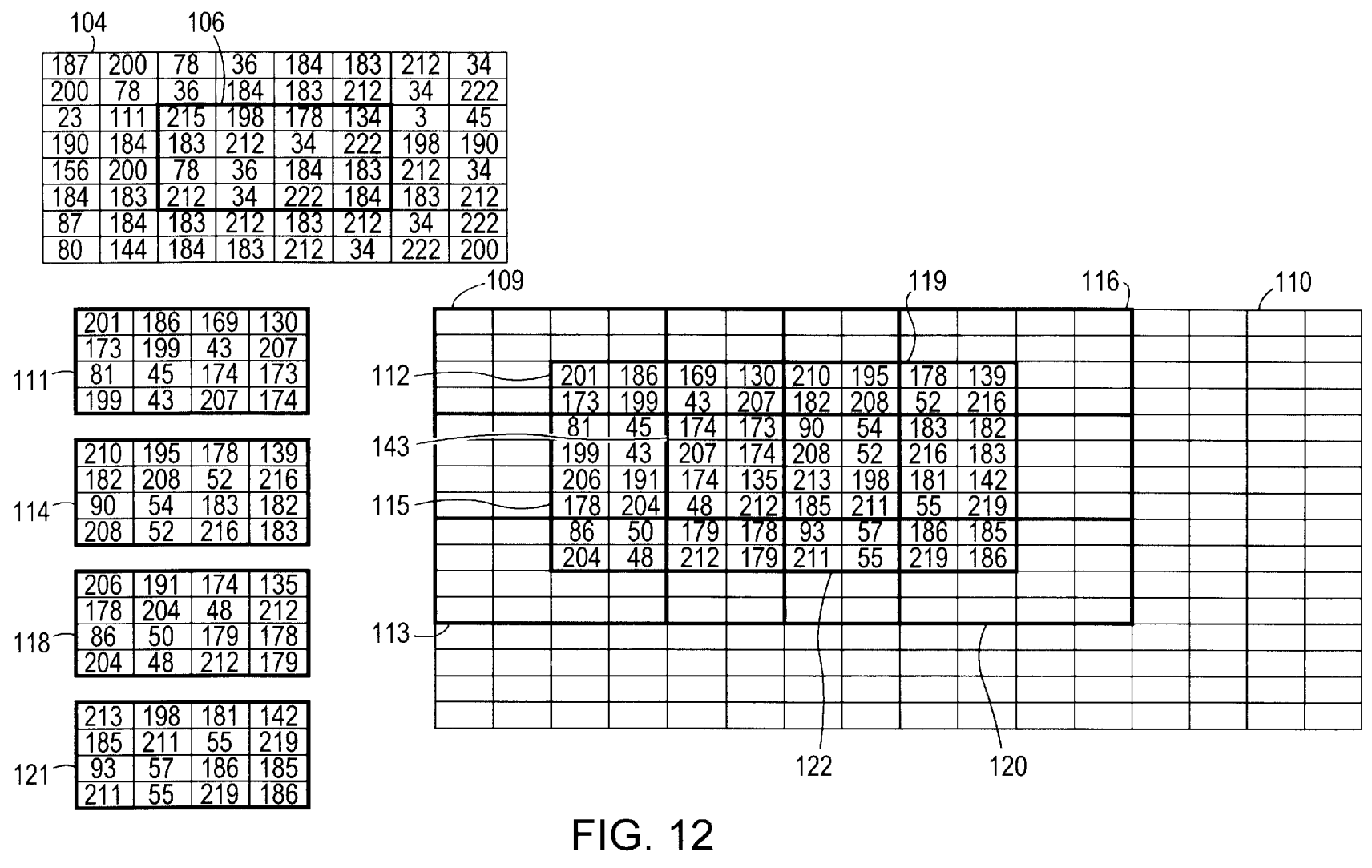

FIG. 12 shows how this is accomplished for the areas of a 16×16 expanded image array 110 proportionally corresponding to the area of array 100 covered by domain blocks A, B, D and E. Domain block A proportionally corresponds to the 8×8 block 109 at the upper left-hand corner of expanded image array 110. Adverting to Table 1, a p of ⅞ and a q of 13 is applied to each pixel value of range center data 106 resulting in transformed array 111. Thereafter, transformed array 111, is inserted into the center 4×4 area 112 of block 109 proportionally corresponding to the area occupied by the domain center data of domain block A of array 100. Domain block D proportionally corresponds to the 8×8 block 113 of expanded image array 110. Adverting to Table 1, a p of ⅞ and a q of 18 is applied to each pixel value of range center data 106, resulting in transformed array 114 which is inserted into the center 4×4 area 115 of block 113. Domain block B proportionally corresponds to the 8×8 block 116 of expanded image array 110. Adverting to Table 1, a p of ⅞ and a q of 22 is applied to each pixel value of range center data 106 resulting in transformed array 118 which is inserted into the center 4×4 area 119 of block 116. Domain block E proportionally corresponds to the 8×8 block 120 of expanded image array 110. Adverting to Table 1, a p of ⅞ and a q of 25 is applied to each pixel value of range center data resulting in transformed array 121 which is then inserted in to the center 4×4 area 122 of block 106. This procedure is repeated for each area of expanded image array 110 until expanded image array 123 of FIG. 13 results.

It will be noticed that this procedure does not provide values for the two pixel border 124 of expanded image array 123. This results from the choice of domain blocks A–I. There are at least three ways to complete two pixel border 124: (1) apply appropriate non-center portions of range block 104, (2) expand the number and coverage of domain blocks such that all pixels of array 100 are covered by domain center data 106, or (3) by repetitively copying the pixel values of the first and last rows and columns of array 100 into expanded image array 110.

EXAMPLE 2

Figures 13, 15:
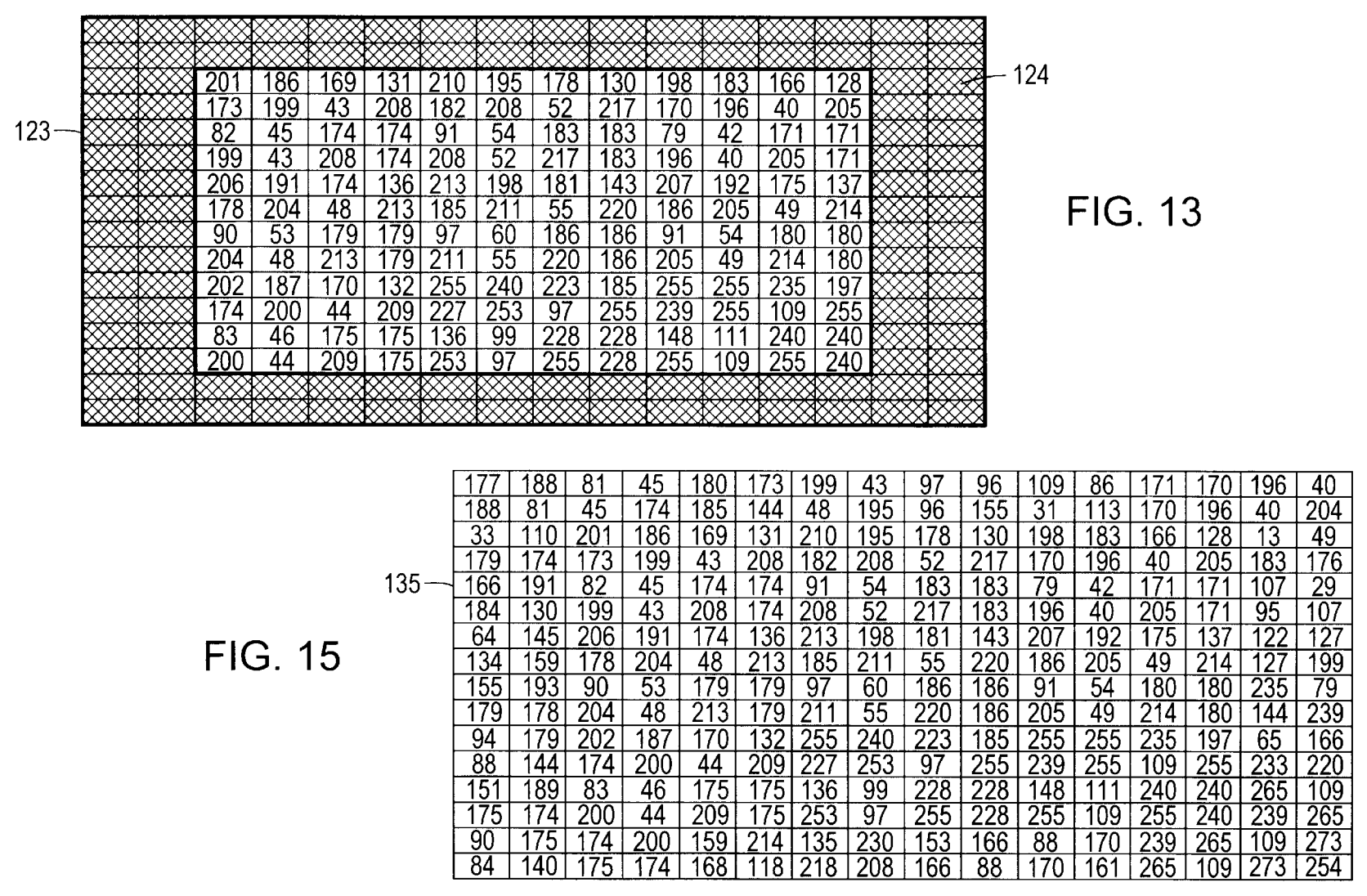
Figure 14:
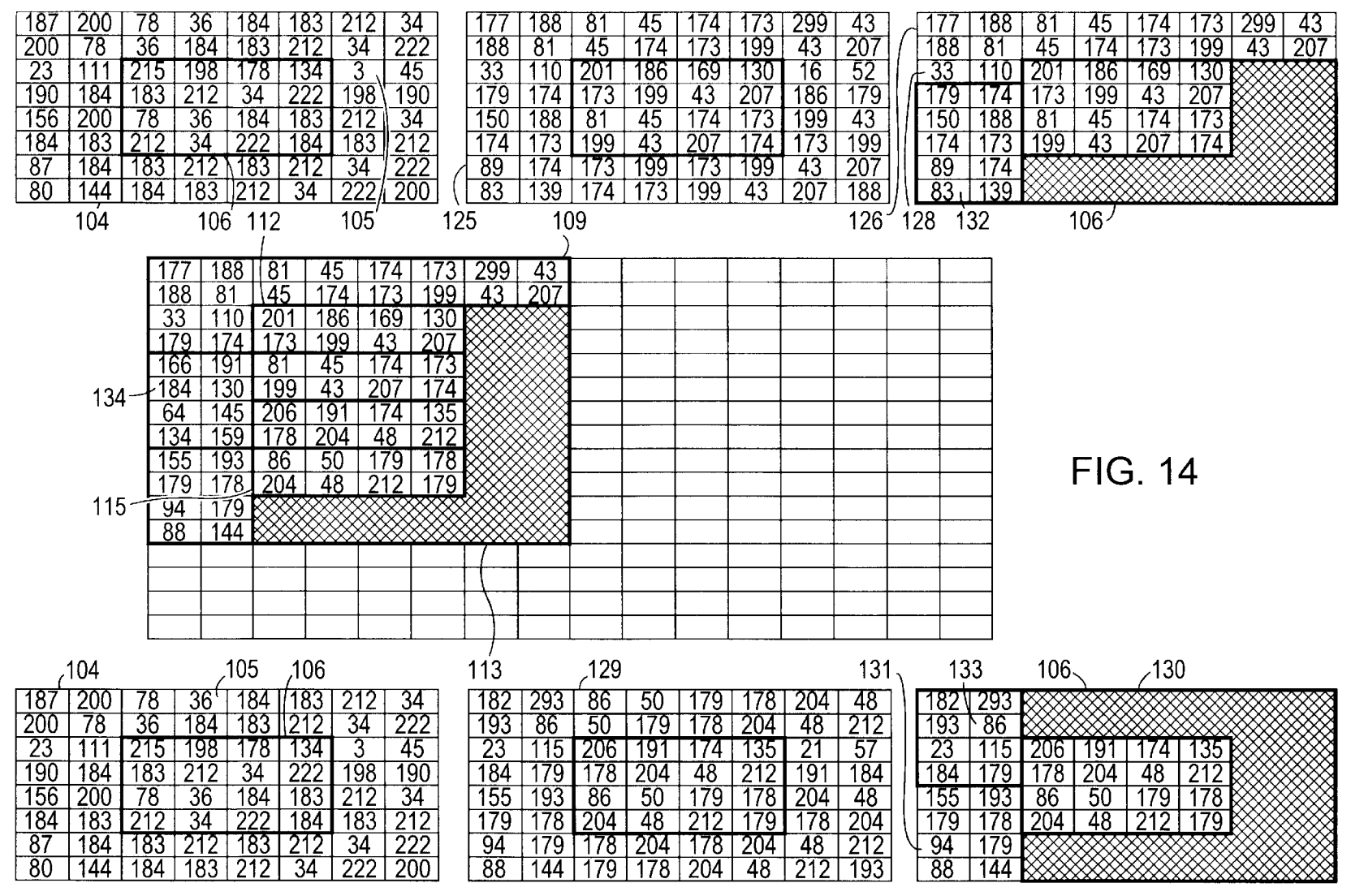

FIG. 14 shows a mapping of not only transformed range center data 106 into area 112 of block 109 and area 115 of block 113, but also appropriate portions of range border data 105 into block 109 and block 113. Range border data 105 includes all pixel values of range block 104 other than range center data 106. Examining block 109, a p of ⅞ and a q of 13 is applied to range block 104, resulting in transformed array 125. Array 126 includes range center data 106 and a portion 128 of transformed array 125 that will cover that part of two pixel border area 124 within block 109. Turning now to block 113, a p of ⅞ and a q of 18 is applied to range block 104, resulting in transformed array 129. Array 130 is that portion of transformed array 129 including range center data 106 and a portion 131 of transformed array 129 that will cover that part of two pixel border area 124 within block 114. It will be noted that a 2×4 portion 132 of array 126 overlaps a 2×4 portion 133 of array 130. As a pixel has one value, the average of each pair of corresponding pixel values is calculated, yielding a single 2×4 portion 134 in expanded image array 110. This procedure is followed for each portion of border area 124. FIG. 15 shows the resulting expanded image array 135, a complete enlargement of array 100.

EXAMPLE 3

Figures 16, 17:
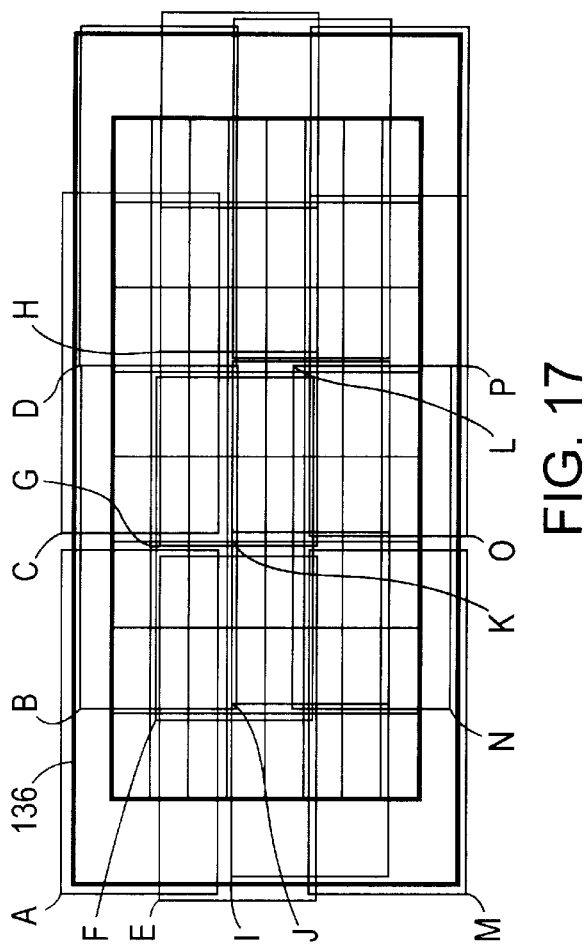
FIG. 16 shows an intermediate image array.
FIG. 17 shows the partitioning of an intermediate image array into sixteen domain blocks.

A second method to generate missing border data for two pixel border area 124 is to artificially expand array 100 such that all pixels of an array twice the size of array 100 will be covered by range center data 106. In this method, array 100 is placed in a 10×10 intermediate array 136 shown in FIG. 16. Initially, each pixel value of intermediate array 136 is set at 128, neutral gray. Array 100 overwrites the central pixel values of intermediate array 136, but each pixel in pixel border area 138 retains its preset pixel value. As shown in FIG. 17, intermediate array 136 is partitioned into 16 partially overlapping domain blocks, referred to by reference characters A–P. The additional two rows and two columns of pixels allows mapping of seven more domain blocks, and a full mapping of array 100 by domain center data 106. Accordingly, the method of Example 1 can be followed to provide a 16×16 final array fully populated by pixel values derived from range center data 106.

EXAMPLE 4

A third way to complete pixel border area 124 is to copy each pixel value of the one pixel border of array 100 into a plurality of pixel locations in two pixel border area 124. For example, the pixel value of the upper-most left pixel, denoted as $$V_{100_{(0,0)}},$$

is 187. This value could be used for $$V_{110_{(0,0)}}, V_{110_{(0,1)}}, V_{110_{(1,0)}},$$

and $$V_{110_{(1,1)}}$$

in expanded image array 110. Each pixel value of the one pixel border of array 100 could be copied four times into pixel border area 124, thus completing expanded image array 110.

EXAMPLE 5

Figures 18, 19, 20:
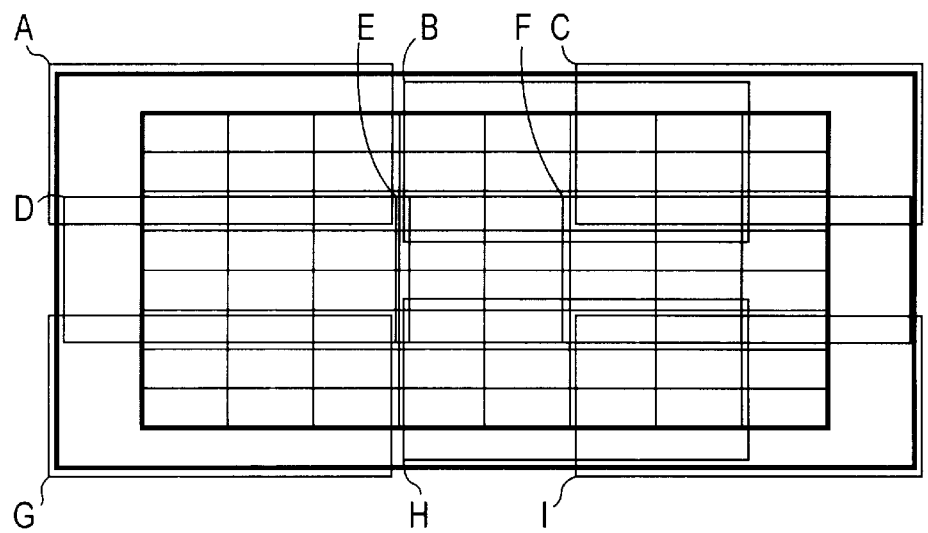
FIG. 18 shows an original array.
FIG. 19 shows a weighting mask.
FIG. 20 shows the partitioning of an intermediate image array into nine domain blocks.

A second method of generating an expanded image array based on an original image array partitioned into overlapping domain blocks is to apply a weighted mask to the contributing range blocks. Referring to FIG. 9 and FIG. 18, the four pixel area 140 in FIG. 18, is covered by domain blocks A, B, D and E of the overlapping domain block scheme of FIG. 9. Accordingly, the pixel values in an expanded image array corresponding to area 140 can be modeled as the summation of contributions from the corresponding pixel values of domain blocks A, B, D, and E for that pixel. This weighting and summation can be expressed through a weighting mask 141 shown in FIG. 19. The coefficients of weighting mask 141 can be described by their unique addresses. For example, if the upper left corner 142 of weighting mask 141 is considered the origin, the coefficients described by $M_{(0,0)}$ and $M_{(2,2)}$ are 0 and ¾, respectively. Although weighting mask 141 is particularly tailored for the overlapping domain block scheme of FIG. 9 and 8×8 range blocks, weighting masks having different coefficients can be used.

Area 143 of FIG. 12 corresponds to area 140 of FIG. 18. Accordingly, the value of $$V_{110_{(4,4)}}$$

of expanded image array 110 can be described in terms of the contributions from transformed arrays 111, 114, 118, and 121 as follows:

$$V_{110_{(4,4)}} = \left(V_{111_{(4,4)}} * M_{(4,4)}\right) + \\ \left(V_{114_{(4,0)}} * M_{(4,0)}\right) + \left(V_{200_{(0,4)}} * M_{(0,4)}\right) + \left(V_{121_{(0,0)}} * M_{(0,0)}\right)$$

The remainder of an expanded image array can be completed by using weighting mask 141 to weigh the contributions of the overlapping domain blocks except for the two pixel border region. For this area, the methods of Examples 2–4 should be used.

EXAMPLE 6

Examples 1–4 have all assumed the mapping of domain blocks using a 4×4 template shifted two pixels to define the each domain block. The invention contemplates different domain block distributions. For example, FIG. 20 shows a mapping of domain blocks A–I covering array 100 based on a 4×4 template shifted by three pixels. Array 100 is augmented by an additional two rows and two columns forming a 10×10 intermediate image array to provide the most efficient mapping.

EXAMPLE 7

If the data within a domain block is generally continuous with no edge conditions present, it may be suitable for expansion using simpler, well-known polynomial interpolation schemes. As such, efficiencies may be recognized by determining whether for each domain block if an edge condition is present, and if not, using the simpler polynomial interpolation methods to expand the data of that domain block. One way to determine if an edge condition is present in a domain block is to quantify the variance of the domain block and compare the variance to a predetermined threshold. Variance is calculated as:

$$\Gamma = \left(\sum_{i=0}^{N}(X_i - \mu)^2/N\right)^{1/2}$$

where, $\mu$ the mean, is $$\sum_{i=0}^{N}\frac{X_i}{N}$$

where N is the total number of $X_i$. It has been determined that for a domain block having a variance less than or equal to 5, a polynomial interpolation method such as a cubic spline interpolation can be used to produce acceptable data for an expanded image array. If the variance is greater than 5, the previously discussed fractal zoom method provides acceptable results. Examples of other acceptable polynomial interpolation methods include bilinear and quadratic interpolation.

FIGS. 21–23 show an example of the cubic spline interpolation method. FIG. 21 shows a 4×4 original image array 144. Array 144 can be divided into nine 2×2 domain blocks. Domain block E is identified in FIG. 21. The mean of domain block A is calculated as:

$$\mu=(6+10+8+4)/4=28/4=7$$

and the variance is calculated as:

$$\Gamma = ((-1^2 + 3^2 + 1^2 + (-3)^2)/4)^{1/2}$$

$$=\sqrt{\sqrt{5}}$$

Therefore, the variance is below 5 indicating cubic spline interpolation should be used to populate the portion of the final array corresponding to domain block E. Turning now to FIG. 22, expanded image array 145 is shown to include area E which proportionally corresponds to domain block E of original image array 144. The pixel values of domain block E are used as one-third of the pixel values in area A'. In FIG. 22, nine of the locations not corresponding to pixel value in FIG. 21 have been given values through fractal zooming of the other domains. Cubic spline interpolation is then used to populate the remaining 13 pixels of area E'. For example:

$$X_1 = \frac{-1}{8}(5) + \frac{5}{8}(8) + \frac{5}{8}(4) - \frac{1}{8}(6)$$
$$= \frac{-5}{8} + \frac{40}{8} + \frac{20}{8} - \frac{6}{8}$$
$$= 6.125 \approx 6$$

$$X_2 = \frac{-1}{8}(7) + \frac{5}{8}(10) + \frac{5}{8}(4) - \frac{1}{8}(6)$$
$$= -\frac{7}{8} + \frac{50}{8} + \frac{20}{8} - \frac{6}{8}$$
$$= 7.125 \approx 7$$

$$X_3 - \frac{1}{8}(7) + \frac{5}{8}(8) + \frac{5}{8}(6) - \frac{1}{8}(6) = -\frac{7}{8} + \frac{40}{8} + \frac{30}{8} - \frac{6}{8}$$
$$= 7.125 \approx 7$$

Thus, it is possible to fully populate area E' of expanded image array 145 as shown in FIG. 23 results.

Distant Zooming

The invention also contemplates transmission of an image in a highly compressed form and decoding of the compressed form into an enlarged representation visually similar to the original image. Examples 1–7 discussed purely local generation of an expanded image.

Fractal transform methods for image compression are known. These methods typically partition an image into a set of subareas called domain blocks, with the property that each member of the array (i.e., each pixel of the image) is contained in one of these domain blocks. The domain blocks thus collectively contain all data of the image. To provide the desired data compression, each domain block can be represented by a "codeword". A codeword comprises an identifier of a corresponding "range block" and an identifier for a transformation. Range blocks are also comprised of subareas of the original array. A range block need not be one of the predetermined domain blocks, can overlap other range blocks, and is usually larger than the domain blocks.

In fractal image compression methods, each domain block is assigned a codeword comprising the following components:

1. Range block address
2. Reduction operator
3. Symmetry operator
4. Pixel operator These codewords can be transmitted and received by a distant location in much less time than transmitting a file have the array stored as a collection of pixels. The information provided in the codewords also provides the necessary information to practice the invention and create an expanded image array from the recovered original image array at a distant location.

EXAMPLE 8

The current invention can be used in the transmission, recovery and expansion of an original image array at a distant location. A particular benefit of the present invention is its independence from compression methods used to ease the transmission of an original image array. This is because the original image array is first recovered using decoding method matching the method used to compress the original image array before the method of the invention is applied.

Generally, a distant location receives a compressed data array including data blocks holding compressed representation of the original image array and expansion data. These data blocks may be separate and independent from one another, or a single block of data may serve as both the compressed representation of the original image array and provide the expansion data.

If non-fractal transform compression methods are used, the compressed data array will comprise two separate blocks of data, a compressed representation of the original image array and expansion data. The original image array will first be recovered from the compressed representation of the original image array. The expansion data is a series of codewords, one for each domain block. Each codeword identifies a domain block and a range block of the original image array, and provides the symmetry and pixel operators needed to transform the identified range block into a range block most similar to the domain block. The expansion data is then used as described previously to provide the expanded image array.

If fractal transform methods were used to compressed the original image array prior to transmission, the codewords generated by the compression can be used not only to recover the original image array, but by the methods of the present invention to generate or to produce an expanded image array.

Finally, even if the compressed data array includes no expansion data, the data processor at the distant location can calculate the codewords from the recovered original image array and produce an expanded image array.

EXAMPLE 9

Figure 24:
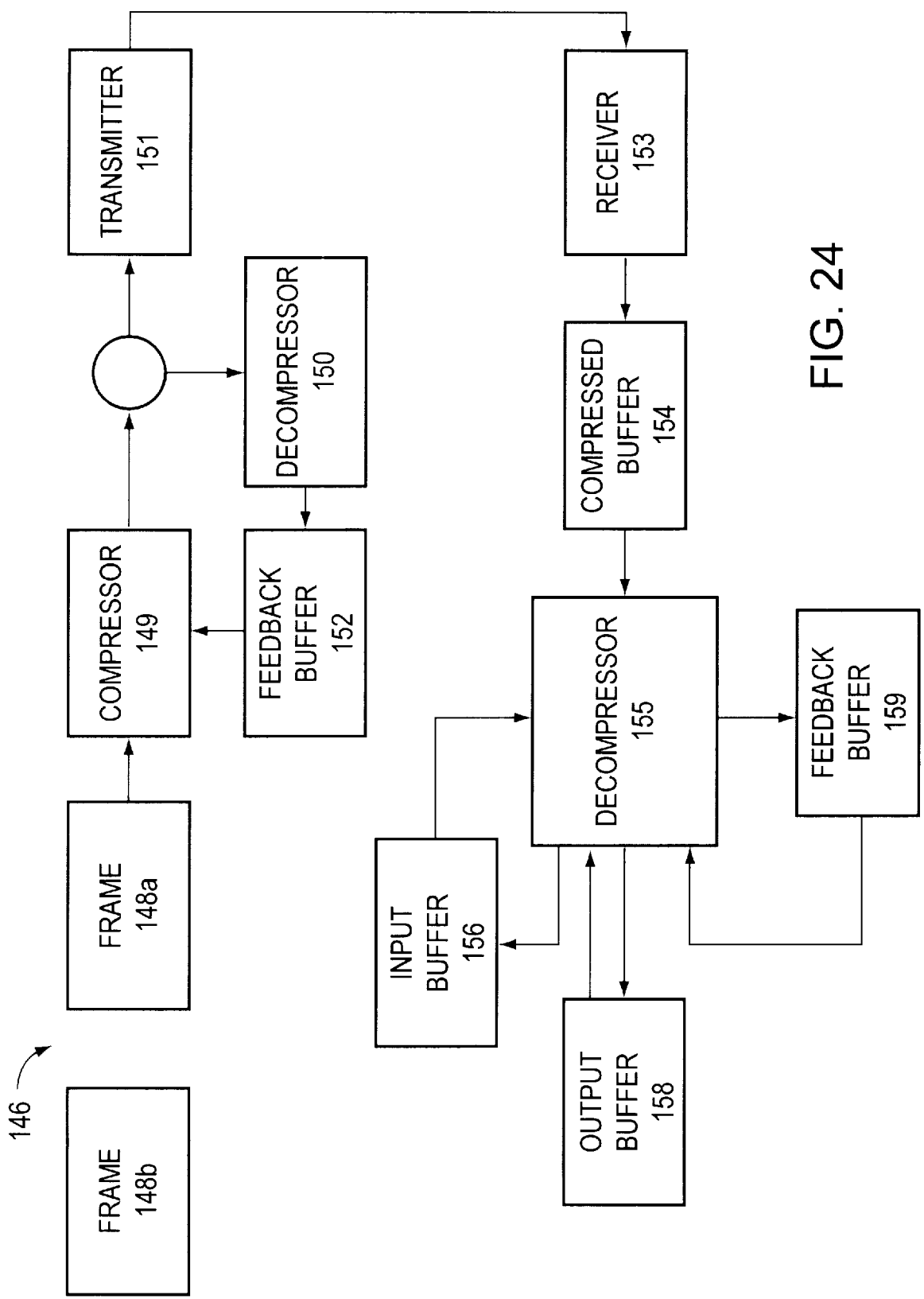
FIG. 24 is a block diagram of apparatus for expanding the frames of a video stream.
Figure 25:
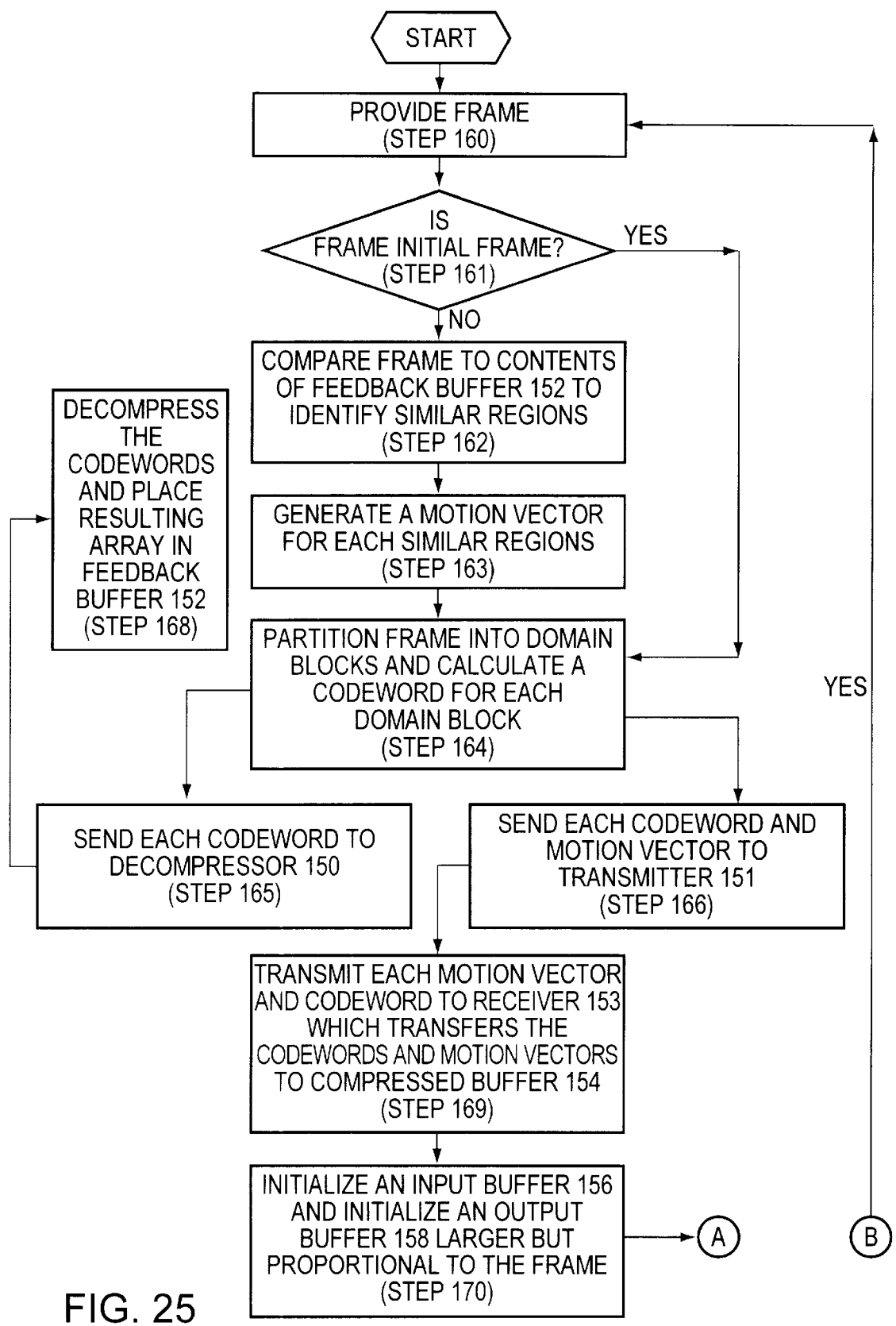
FIG. 25 is a logic flow diagram of a method for expanding the frames of a video stream.
Figure 25:
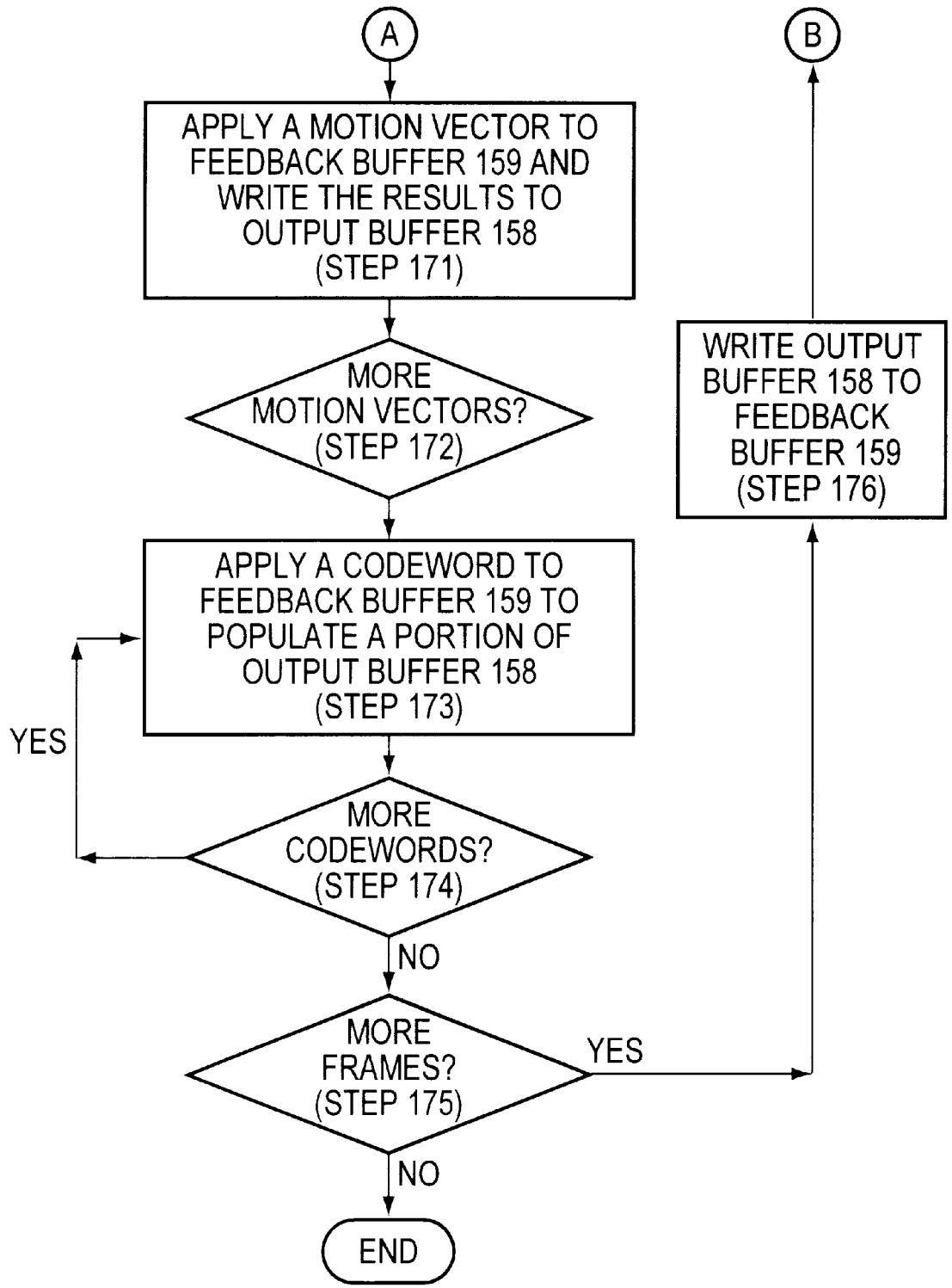

It is also known to use this same transmission method for a video stream. A video stream can be best characterized as a series of individual frames displayed in rapid succession. It is known that successive images in a video stream have similarities. That is, a portion of a following frame may share portions with its preceding frame. Each similarity can be represented by identification of the similar portion and a motion vector describing the translation of the similar portion between the preceding and following frames. Accordingly, increased efficiency in transmission based on similarity between frames can be added to the increased efficiency of transmitting and displaying a video stream based on the self-similarity of the individual frames. FIG. 24 shows the basic hardware 146 needed to compress, transmit, receive, decompress and enlarge frames of a video stream. FIG. 25 describes the distant expansion of a video stream using hardware 146.

A frame 148a is presented to a compressor 149 in the form of a data array (Step 160). It is determined whether or not frame 148a is the initial frame (Step 161). If frame 148a is the initial frame, it is partitioned into overlapping domain blocks covering entire frame 148a. Following the methods described in the '600 patent, frame 148a is compressed into a set of codewords (Step 164). Each codeword is sent to a local decompressor 150 (Step 165) and also to a transmitter 151 (Step 166). The codewords sent to local decompressor 150 are decoded to recover a copy of frame 148a that is placed in a feedback buffer 152 (Step 168). The contents of feedback buffer 152 will be used later.

The set of codewords sent to transmitter 151 is transmitted to a distant receiver 153, transferred to a compressed buffer 154, and decoded by decompressor 155 into a copy of frame 148a that is placed in an input buffer 156 (Step 169). Input buffer 156 has dimensions identical to frame 148a. An output buffer 158 having the desired expansion dimension is also initialized. As no motion vectors have yet been generated, each codeword is applied to input buffer 156 as described in Example 1 to populate a portion of output buffer 158 (Step 173). This is done for each codeword (Step 174) until output buffer 158 is populated. Output buffer 158 when completely populated is an array visually similar to, but larger than frame 148a.

If other frames are to follow (Step 175), output buffer 158 is written into feedback buffer 159 and the process starts again at Step 160 (Step 176).

The next frame 148b is compared to the contents of feedback buffer 152, which contains a visually similar array to initial frame 148a. As discussed earlier, it is known that similarity exists between successive frames of a video stream. An area of similarity can be identified (Step 162) and described as its coordinates on feedback buffer 152 and a motion vector describing the translation between its location on feedback buffer 152 to its location on frame 148b (Step 163). Frame 148b is compressed into a set of codewords by compressor (Step 164).

Each codeword is outputted to a local decompressor 150 (Step 165) which decodes the codewords to form an array visually similar to frame 148b, which replaces the contents of feedback buffer 151 (Step 168). Compressor 149 also outputs each motion vector and each codeword to a transmitter 151 (Step 166). Transmitter 151 transmits each motion vector and codeword to a distant receiver 153 which writes the motion vectors and codewords into compressed buffer 154 (Step 169). The codewords are decoded by decompressor 157 into a copy frame 148b at its original resolution which is placed into input buffer 156. Each motion vector is applied to feedback buffer 159, which is an enlarged version of frame 148a. The results are written to output buffer 158 (Step 171). Step 171 is performed for each motion vector (Step 172). Next, input buffer 156 is partitioned into domain blocks and range blocks, and each codeword is applied to input buffer 156 as described in Example 1 to populate those portions of output buffer 158 not previously populated by the motion vectors in Steps 171 and 172 (Steps 173 and 174). After processing each motion vector and codeword, output buffer 158 is visually similar to, but larger than frame 148b. If other frames are to follow (Step 175) output buffer 158 is written into feedback buffer 159 (Step 176) and the process starts again at Step 160.

Accordingly, the invention contemplates a method not only of enlarging an image represented by an array, but a method by which a compressed representation of the array can be transmitted and decoded into an array larger but visually similar to the image.

What is claimed is:

1. The method for increasing the dimensions of an original image array comprising a plurality of overlapping domain blocks, the steps performed by a data processor of:

for each domain block, using fractal transform methods to select a best domain/range block correspondence, each said range block being larger than its corresponding domain block;

for each said range block, selecting a subset of data values, and populating an area of an expanded image array with said data values in said selected subset, said area corresponding to said domain block in said original image array;

whereby said expanded image array is larger than and visually similar to said original image array;

prior to applying fractal transform methods to select a best domain/range block correspondence for each domain block of said original image array, said original image array replaces a portion of an augmented original image array such that said original image array is not adjacent any edge of said augmented original image array and said augmented original array is partitioned into a plurality of overlapping domain blocks.

2. The method as recited in claim 1 wherein said original image array represents a two-dimensional entity and each said domain block and range block and said expanded image array are two-dimensional.

3. The method as recited in claim 1 wherein said original image array represents a three-dimensional entity and each said domain block and range block and said expanded image array are three-dimensional.

4. The method as recited in claim 1 wherein said domain blocks comprise domain border data and domain center data, and said domain center data of any domain block does not overlap the domain center data of any other domain block.

5. The method as described in claim 1 wherein said expanded image array comprises data values taken solely from said original image array.

6. The method of producing an expanded image array larger than, proportional to, and visually similar to an original image array representative of a physical entity, comprising the steps performed by a data processor of:

(a) inputting a compressed data array, said compressed data array including a compressed representation of said original image array;

(b) recovering said original image array from said compressed representation;

(c) determining if expansion data is present in the compressed data array; and (d) expanding said original image array into an expanded image array using expansion data if present in the compressed data array by partitioning an input buffer into domain blocks as defined by codewords of the expansion data, and for each domain block replacing an area of an output buffer with a portion of the range block identified by the codeword corresponding to the domain block, the area corresponding to the domain block location in the input buffer.

7. The method as recited in claim 6 wherein said compressed representation of said original image array is derived by performing other than fractal transform methods;

said expansion data is a series of codewords, said codewords derived by partitioning said original image array into overlapping domain blocks and partitioning said original image array into range blocks, and for each domain block performing fractal transform methods to select a best domain/range block correspondence, each range block being larger than its corresponding domain block;

said expansion accomplished by, for each codeword, selecting a subset of data values in its corresponding range block and populating an area of said expanded image array with said data values, said area corresponding to said domain block location in said original image array.

8. The method as recited in claim 6 wherein said determination in said step (c) determines that the compressed data array does not include any expansion data, and after said recovery of said original image array, partitioning said original image array into overlapping domain blocks and partitioning said original image array into range blocks, and, for each domain block, (1) using fractal transform methods to select a best domain/range block correspondence in said original image array, said range block being larger than said domain block, (2) selecting a subset of data values in said range block, and (3) populating an area of said expanded image array with said data values in said selected subset, said area corresponding to said domain block location in said original image array.

9. The method of processing a compressed data array including codewords and motion vectors, each compressed data array representing a frame in a video stream, each codeword representing one of a plurality of overlapping domain blocks, each domain block covering an area of a frame, comprising the steps performed by a data processor of:

(a) providing a representation of the previous frame in a feedback buffer having predetermined dimensions;

(b) inputting a compressed data array into a compressed buffer;

(c) recovering said frame from said compressed data array and writing the covered frame into an input buffer;

(d) applying each motion vector to said contents of said feedback buffer and writing the results to an output buffer having the same dimensions as those of said feedback buffer;

(e) partitioning said input buffer into overlapping domain blocks and range blocks;

(f) determining which codewords do not correspond to areas of said output buffer previously populated by said motion vectors in step (d) and decoding each non-conflicting codeword by selecting a subset of data values in said range block identified by said codeword and populating an area of said output buffer with said data values, said area corresponding to said domain block location in said frame;

(g) replacing said feedback buffer with the contents of said output buffer;

(h) determining if another frame is to be decoded, and if so, repeating steps b–h.

* * * * *